United States Patent [19]
DeMarco

[11] 3,905,621
[45] Sept. 16, 1975

[54] HOSE COUPLING OR ADAPTER FOR INDUSTRIAL VACUUM UNITS

[75] Inventor: Thomas M. DeMarco, Chicago, Ill.

[73] Assignee: NFE International, Ltd., Arlington Heights, Ill.

[22] Filed: July 26, 1974

[21] Appl. No.: 492,047

[52] U.S. Cl. .................. 285/7; 285/177; 285/419; 285/DIG. 4
[51] Int. Cl.² .......................................... F16L 21/06
[58] Field of Search .......... 285/419, 373, DIG. 4, 7, 285/236, 177

[56] References Cited
UNITED STATES PATENTS

| | | | |
|---|---|---|---|
| 172,669 | 1/1876 | Stevens | 285/373 X |
| 1,928,570 | 9/1933 | Mustico | 285/373 X |
| 2,920,908 | 1/1960 | Mitchell | 285/236 X |
| 3,007,722 | 11/1961 | Anderson et al. | 285/419 |
| 3,194,590 | 7/1965 | Cook | 285/373 X |
| 3,402,946 | 9/1968 | Dedian | 285/373 X |
| 3,411,748 | 11/1968 | Fortune | 285/419 X |
| 3,475,038 | 10/1969 | Matherne | 285/419 X |

Primary Examiner—Thomas F. Callaghan
Attorney, Agent, or Firm—Merriam, Marshall, Shapiro & Klose

[57] ABSTRACT

A hose coupling or adaptor is provided for joining two tubular elements such as hoses and includes a thin metallic sheet member formed into a cylindrical coupling member to surround the end portions of the members to be joined and has clamping elements attached to the surface thereof for urging the thin metallic coupling housing into a tight, sealing attachment to the hose or connector elements which are being joined. The thin metallic sheet construction of the coupling facilitates joining tubular members of unequal diameters wherein the coupling deforms at each end to fit securely around each tube section and thereby forms a truncated cone between the tubes being joined.

10 Claims, 8 Drawing Figures

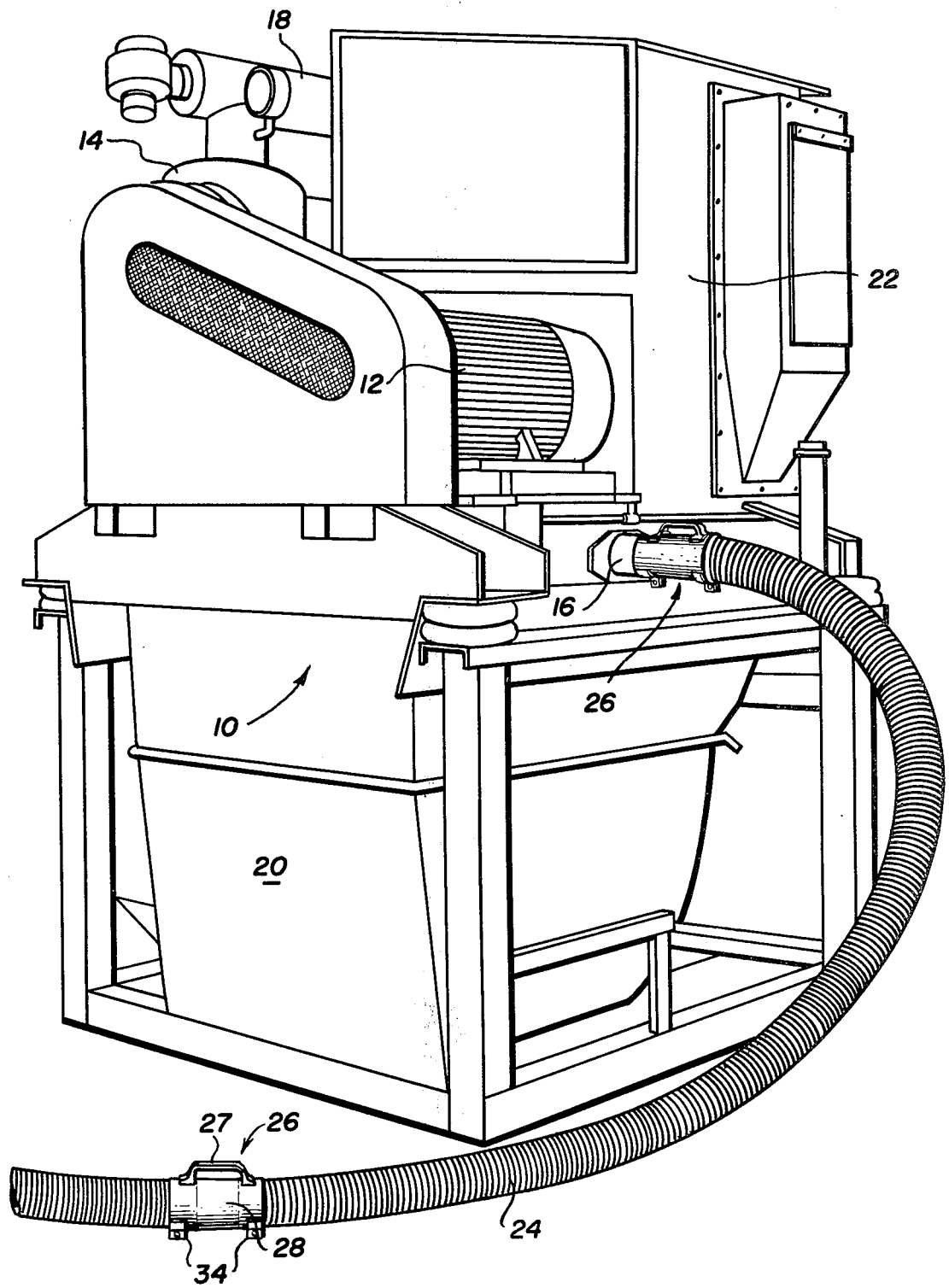

HOSE COUPLING OR ADAPTER FOR INDUSTRIAL VACUUM UNITS

BACKGROUND OF THE INVENTION

1. Field of the Invention

This invention pertains to a coupling element used in conjunction with a heavy-duty industrial vacuum unit and is intended to provide a means for rapidly and securely attaching a hose or piece of tubing to an adaptor of the vacuum unit, and, said coupling member may also be used to join sections of the vacuum hose or tubing together and is of such an inventive design and structure as to provide for easy reliable coupling of hose segments of different diameters.

2. Description of the Prior Art

The heavy-duty industrial vacuum used with this invention is suitable for use in foundries, cement yards, steel mills, and the like where there is a need, and, oftentimes a statutory requirement, to keep the area as clean as possible not only for the safety of workmen and other personnel in the area but also to prevent air pollution. It is particularly important to eliminate fine particles such as sand, dust and other lightweight particles from a work area or factory to prevent these particles from entering the air and subsequently being caught in an exhaust fan air stream and being discharged into the atmosphere, thus posing a potential violation of environmental protection standards in the adjacent locality. Additionally, with the strict requirements of the recently inacted Occupational Safety and Health Act (OSHA) it is now, more than ever, important to control and eliminate debris which can present an immediate danger to persons in the work area, as well as eliminate air borne particles which can cause respiratory disorders over the long run. Hence, there is a necessity for not only having a heavy duty industrial vacuum at these locations but also for fully utilizing the capabilities of each vacuum unit.

Prior art couplers for connecting hoses to adaptors on a vacuum unit or for use as in coupling tube segments together generally have involved rigid tubular inserts which are forced into the pieces of tubing to be connected, and thereafter mechanically attached to the tubing by a suitable clamping or other attaching unit. Insert type of couplings interfere with air flow through the hoses and can result in collection of particles and eventually produce a blockage at the joint. Problems encountered with these devices generally arise from the fact that often times segments of hosing which are to be connected either to a vacuum unit or to be connected together often are of varying diameters and thereby require an unnecessary multitude of coupling adaptors to provide a continuing capability of joining all segments together. The coupler of the present invention eliminates the requirement for maintaining a large inventory of coupler units to meet the needs for joining different diameter tubing together as well as joining tubing to various diameter adaptors on industrial vacuum equipment. Consequently, the present invention provides a single coupler which may be utilized to couple a variety of diameters of hosing together, as well as provide an adaptor suitable for connecting various sizes of flexible hose to the metallic pipe intake of a vacuum unit.

SUMMARY

This invention is directed to a coupler which may be used to join together different diameter segments of heavy industrial tubing such as that tubing which is used with heavy-duty industrial vacuum units. Additionally, coupling has applications outside of joining two hoses together and may be used on the end of a hose to provide a coupling for attaching a number of different diameter hoses to the vacuum unit.

The operative features of the coupling of this invention evolve from the design which provides a thin metal housing, such as constructed from a light gauge stainless steel, formed into a generally cylindrical shape and having overlapping axially extending portions to insure a relatively tight seal when the coupling is secured to the end portions of different diameter pieces of tubing. By providing a relatively thin, yet structurally reliable and sound metal housing, the applicant thereby supplies a coupling member suitable for joining different size pieces of tubing together. By placing coupling clamping elements at the end of the coupling member, it is possible to insert different diameter end portions of industrial tubing into each end of the coupling and then urge and bend the ends of the coupling tightly around the telescoped end of the associated tubing. Thus, it may be noted that the thin sheet of the coupling is allowed to distort to a degree sufficient to clamp and seal tightly around the associated telescoped tube end. In such a use joining different diameter tube ends, each end of the coupling will be held in a generally cylindrical shape conforming to the cylindrical contour of the associated tube while the intermediate section of the coupling will be somewhat tapered and have the form of a truncated cone.

The purpose of this invention is to provide a lightweight, reliable coupling or adaptor suitable for joining different diameter tubular members in an air-tight fashion wherein the coupling adaptor has clamping members located at each end for bending the thin sheet of the coupling into frictional secure engagement with the end of a tube telescoped into the coupling. Each clamping member has a rounded attaching portion secured to the coupling to evenly distribute clamping forces around the ends of the coupling. These rounded attaching portions also urge the housing into a cylindrical shape to make joining of heavy hoses easy for a person working alone.

These and other objects of the invention will become apparent from reference to the following description, attached drawings, and appended claims.

DESCRIPTION OF THE DRAWINGS

FIG. 1 is a pictorial view of a heavy-duty industrial vacuum unit wherein the hose associated therewith is coupled to the unit and to an auxiliary hose member by means of the coupling of this invention;

FIG. 2 is a sectional view taken generally along line 2—2 of FIG. 1a;

THE DESCRIPTION

Figure 1A:
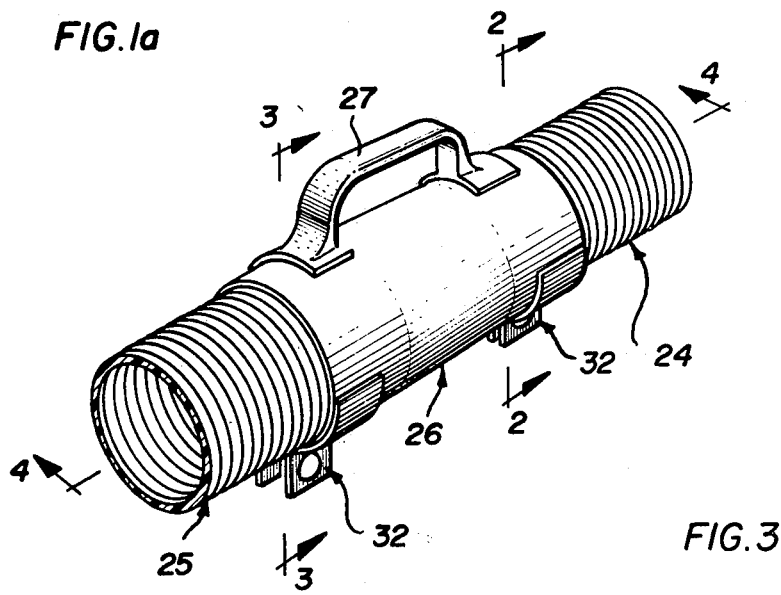
FIG. 1a is a pictorial view of the coupling of the invention shown in an application wherein two segments of different diameter industrial hose are interconnected.

In FIG. 1, there is shown a heavy-duty industrial vacuum unit 10 such as that contemplated for use with the coupler or adaptor of the present invention. The vacuum unit 10 includes a heavy-duty electric drive motor 12 that is coupled with a positive displacement heavy-duty compressor indicated at 14. The intake or suction side of the compressor 14 is connected with an intake pipe 16 that is an integral part of the vacuum unit 10. Thus to utilize the vacuum unit the motor 12 is simply turned on and a hose as disclosed in FIG. 1 may be coupled to the intake pipe 16 for commencing of cleanup operation. On the outlet side of the compressor is an outlet pipe 18 which also may include a muffler (not shown) to reduce the noise of the compressed, high velocity air leaving the compressor 14. The vacuum unit 10 includes a removable debris gathering receptacle or dump hopper 20 which may be easily removed from the vacuum unit for emptying. To insure complete removal of airborne debris and moisture, the heavy-duty industrial vacuum unit used with this invention includes a plurality of filtering stages in the filtering chamber 22 including a whirlwind or cyclone type filter unit in combination with both air stream reversing, and screening types of filtering elements.

Figure 4:
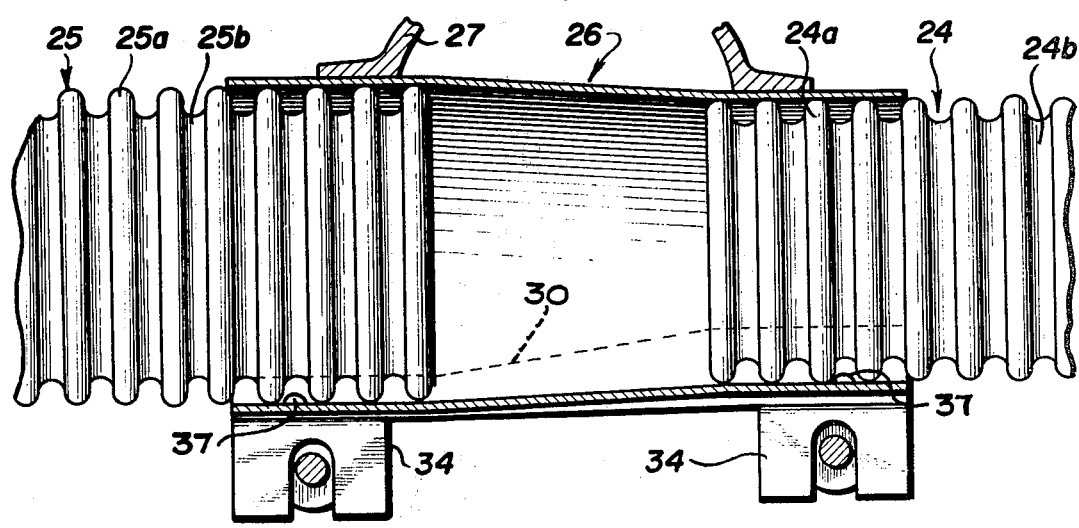
FIG. 4 is a partial sectional view taken generally along line 4—4 of FIG. 1a with the coupling in cross section and showing the amount the coupling deforms to follow the contour and diameter of unequal diameter tubing telescoped into the coupling.

FIG. 4 shows how the coupling of this invention is particularly adapted to connect different diameter rigid plastic hose sections. The term plastic as used herein includes thermoplastics, elastomers, reinforced fabric, and the like which are used as hose materials. Hose 24 has a smaller diameter than the associated coupled hose 25. Due to operating pressures and rough handling, each hose used with the heavy-duty industrial vacuums must be of an extremely rigid construction and thus not easily deformed. Consequently, the smaller diameter hose 24 contains a plurality of annular rings 24a which are generally circular in cross section and extend continuously about the periphery of the hose. Interconnecting each annular stiffening ring 24a is a web 24b which combines with annular rings 24a to provide a hose which has the required strength and flexibility for industrial purposes. Likewise, the larger diameter hose 25 also is constructed generally of the same elements including a plurality of annular rings 25a which are interconnected by web sections 25b.

The coupling of this invention is designated by the numeral 26 and may include a handle 27 to provide for ease of transport and handling of the coupling during both attachment and detachment from tubular or hose elements. Handle 27 has rounded mounting pads which function to urge the sheet 28 of the coupling 26 into a curved cross section to make attachment of hose sections easier. The coupling 26 is formed from a thin sheet 28 that will adapt to the cross section and contour of the hose end sections which are telescoped into and confined within the coupling ends. It is suggested that the sheet material which forms the coupling housing be approximately a No. 20 gauge stainless steel or the like. Other thin sheet materials such as aluminum, spring steel, phosphor-bronze or mild steel or even reinforced plastics could be used. The thin sheet 28 may be rolled into a diameter approximating the average diameter of hose segments which could be coupled. One longitudinal or axially extending free edge of the thin sheet 28 is rolled over and indicated by the numeral 29 (see FIGS. 5 and 6). This exposed edge 29 is rounded, rolled over, or otherwise shielded or covered in such a manner to prevent injury to the personnel handling the coupling. The other longitudinal or axially extending edge of the coupling 26 is edge 30 and is an overlapping edge that is seated on the inside surface of the coupling 26.

Figure 2:
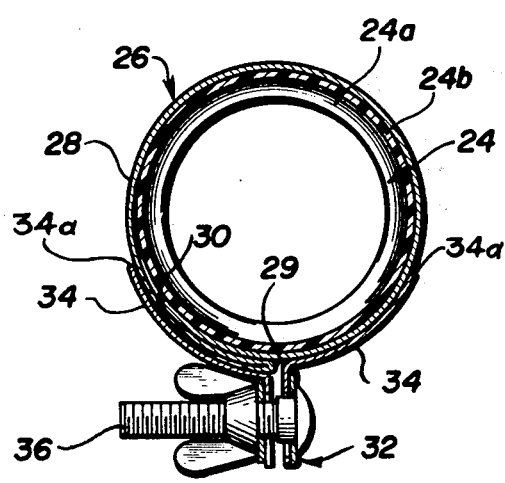

Attached at each end of the coupling is a clamp assembly 32. Each clamp assembly is positioned at the end of the coupling to urge the thin sheet coupling onto the telescoped hose disposed radially thereunder when the associated clamp is tightened. Thus the sealing and securing of a telescoped piece of tubing within each end of the coupling 26 depends not only on the clamping force exerted by the clamp element 32 but also depends upon the deformation of each end of the coupling housing. The distortion of the coupling ends which occurs as each clamp is tightened and the thin sheet 28 is wrapped into frictional engagement with the outside surface of a telescoped portion of the vacuum tube provides a secure air tight coupling of hoses. The clamp assembly 32 can be any convenient design and an assembly utilizing brackets 34 and tightening bolts 36 is disclosed in this application. However, other clamping arrangements such as toggle type clamps or the like may be used. It is contemplated that any bracket such as the bracket 34 will have an adequate arcuate attaching portion in connection with the thin sheet 28 to adequately distribute tightening forces around the periphery of each end of the coupling 26 and securely and uniformly urge the coupling into frictional holding and sealing engagement with the associated hose. Also, by attaching one of the brackets 34 on the rolled-over edge 29 tightening forces are more effectively distributed around the end of the coupling housing to provide a uniform seal around each hose. These arcuate, rounded sections of each bracket 34 also maintain the thin coupling sheet 28 in a rounded shape to permit one person to easily join two hose segments. As mentioned earlier, the clamping forces which must be provided should be sufficient if necessary to partially distort or bend the end of the coupling into a circular collar type member encircling the associated tube end to provide a snug sealing engagement around the end of the tube. In practicing this invention it is suggested that the angle formed between the ends 34a of each bracket 34 and the center of each piece of tubing be approximately 90° when the clamp assembly 32 is in the tightened position of FIGS. 2 and 4. Each rounded connecting portion of the clamp assembly should have a length equal to at least one-eighth of the circumference of the maximum size tube to be joined.

Figure 3:
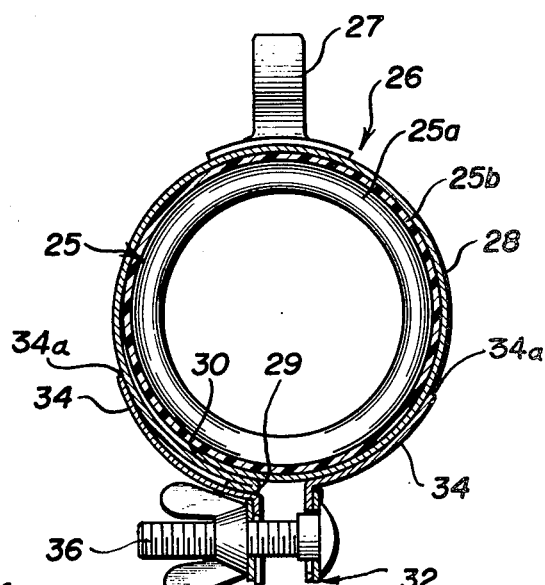
FIG. 3 is a sectional view taken generally along line 3—3 of FIG. 1a showing the end of the coupling in the position prior to fully clamping the end of the coupling around the associated telescoped tubing.
Figure 5:
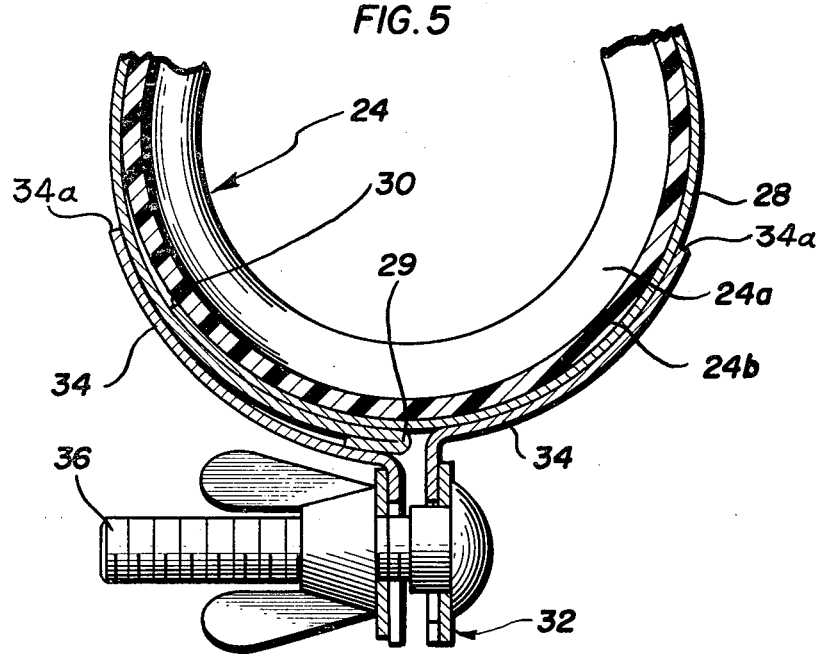
FIG. 5 is an enlarged section view of the coupling tightening members shown in FIG. 2.
Figure 6:
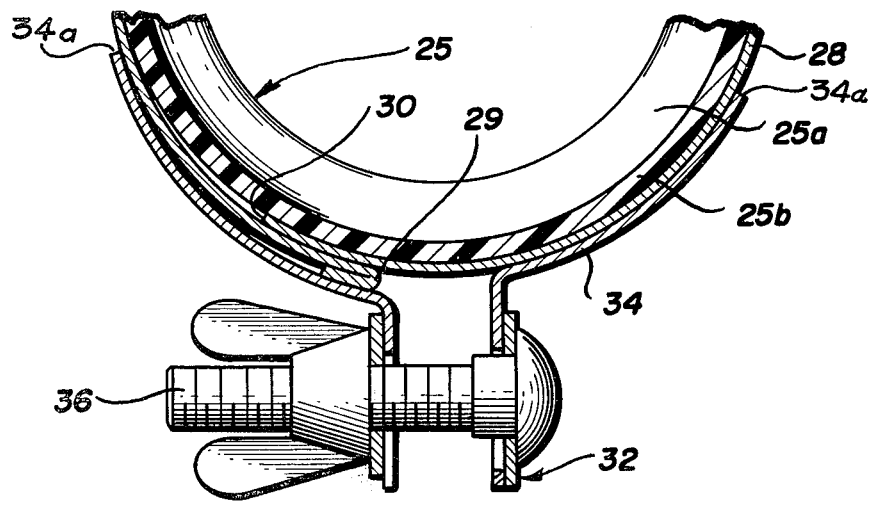
FIG. 6 is an enlarged section view showing the clamping structure of FIG. 3.
Figure 7:
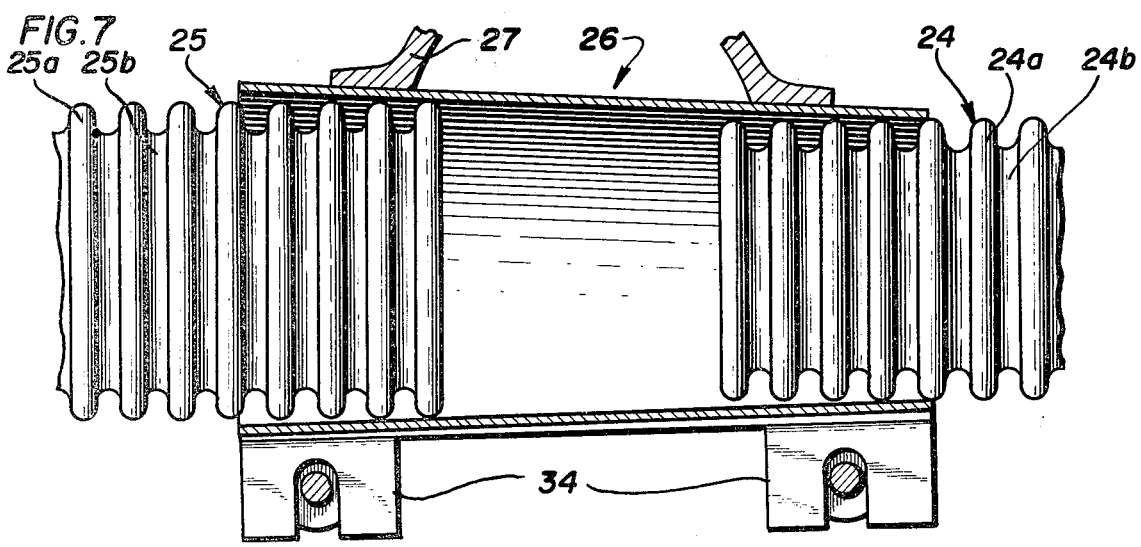
FIG. 7 is an enlarged partial sectional view similar to FIG. 4 but showing the coupling and associated different diameter telescoped hose ends prior to tightening the clamps and urging the coupling ends onto each hose end.

With reference to the drawings the functioning of the coupling 26 during tightening will be explained. When the hoses are initially telescoped into the coupling 26, coupling 26 is in a loose or untightened configuration which is shown in FIGS. 3, 6, and 7. The overlapping axially extending edge 30 is spaced somewhat beyond the protected edge 29 and thus when subsequent tightening of the clamp assembly 32 occurs the edge 30 will move circumferentially up along the inside surface of the coupling 26 into a position similar to that illustrated in FIGS. 2, 4 and 5. FIG. 5 shows the arrangement of the coupling 26 and clamping element 32 when the tubes are securely fastened within the coupling. Because these heavy-duty industrial type hoses are very stiff and rigid, it cannot be assumed that they will deform to a sufficient degree so as cooperate with the coupling for sealing purposes. Thus, the coupling 26 is constructed of a thin sheet material which will deform in a manner to conform to the contour and diameter of different diameter hose sections which are to be joined.

As shown in FIG. 4, the end sections of coupling 26 may include hose gripping means 37 for mechanically gripping a secured hose end. Gripping members 37 may be indentations in the sheet 28 or may be separate members spot welded or joined in any other manner to the sheet. It is contemplated that gripping means 37 will be distributed intermittently about the inside ends of the coupling so that the sheet 28 is not unduly rigidified yet the holding means 38 will adequately hold the associated tube.

Thus, from the foregoing description, it is shown that the coupling of the present invention provides a capability for joining a multitude of hose segments together without strict adherence to using only hoses of the same diameter. This joining capability improves the range of the heavy-duty industrial vacuum with which the coupling 26 is utilized and also eliminates the bothersome requirement that all segments of tubing have the same inside or outside diameter. The thin wall metallic coupling of this invention is rigid and strong enough to withstand the abuse customarily administered to these tubing segments when in industrial application yet flexible enough to permit the coupling ends to be fitted tightly around each hose that is telescoped into each end of the coupling.

By utilizing a thin wall coupling in this invention, the coupling assumes a somewhat truncated cone shape transition section intermediate of the hoses to be coupled when different diameter hose segments are telescoped into each end of coupling 26. As noticed in FIG. 7, the ends of the coupling are initially in line contact with the extreme end of each hose element and only after tightening of each clamp assembly 32 are the coupling ends urged into surface or area contact which produces frictional, sealing contact between coupling 26 and the associated telescoped hose end to form a reliable sealed connection between the different diameter tube segments.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In an industrial vacuum system, a coupling for joining together two sections of plastic tubing having different diameters, the improvement comprising:
   a longitudinally divided thin sheet housing having a truncated, cone shaped portion and having axially spaced end portions suitable to receive sections of tubing telescoped therein and said end portions of the housing having an inside surface for frictionally engaging the associated telescoped tubing;
   said coupling housing including axially extending edges including an inner edge and an outer edge for overlapping the inner edge and for positioning the inner edge adjacent the inside surface of the coupling housing, said outer edge having means to prevent injury to personnel handling the coupling;
   clamping means positioned at each end of the housing and having hand operable tightening means and also having arcuate connecting portions including means attached to each end portion of said coupling housing, and, each arcuate connecting portion having a length extending for at least 45° to distribute sealing and connecting forces around the coupling periphery at each end of the coupling whereby each end of the coupling is radially movable inwardly upon tightening of said clamping means to grip the underlying periphery of the associated tubing section in sealing and fastening relationship.

2. The coupling of claim 1, wherein:
said thin sheet housing includes handle means attached thereto and positioned radially opposite said clamping means, and said handle having an arcuate attaching portion cooperating with the arcuate connecting portion of the clamping means to urge the coupling into a rounded shape.

3. The coupling of claim 1, wherein:
said thin sheet housing is stainless steel.

4. The coupling of claim 1, wherein:
said clamping means bracket two cooperating bracket portions extending outwardly of the coupling and one of said bracket portions has an open-ended slot and the other bracket portion has an opening, and, said slot and said opening being aligned to secure said tightening means.

5. The coupling of claim 1, wherein:
each end portion of the coupling housing includes inwardly directed tube gripping means including means spaced intermittently about the inner periphery thereof.

6. In an industrial vacuum system, a joint formed between two sections of plastic tubing and including:
   a first circular plastic tube member and a second circular plastic tube member;
   a coupling having an axially divided flexible sheet type of housing and adapted to telescope onto each of said tube members and said coupling includes a truncated cone section intermediate axially spaced end sections;
   clamping means including means attaching said clamping means to said housing at each end section of the coupling;
   said clamping means including a plurality of bracket means arranged in pairs at each end section of said coupling and having an arcuate attaching portion attached to the housing sheet and having a leg portion extending outwardly of the coupling;
   said clamping means also including means for mechanically tightening together said pairs of bracket means;
   said coupling having axially extending edges adapted to overlap and provide a generally circular section and said edges including a first inner edge and a second exposed edge overlapping the first edge, said second exposed edge having means to prevent injury;

each arcuate attaching portion of the bracket means having means extending along at least one-eighth of the length of the associated end section whereby each end section is radially movable inwardly by said clamping means to grip and seal with the underlying plastic tube member.

7. The joint of claim 6, wherein:

handle means attached in a plane opposite said clamping means and said handle having an arcuate attaching base fixedly attached to the housing and thereby urging the underlying sheet into a rounded configuration.

8. The joint of claim 6, wherein:

said clamping means includes a pair of cooperating brackets at each end of the joint and each bracket leg portion has a slot extending outwardly of the housing and being disposed to receive tightening means.

9. The joint of claim 6, wherein:

each end section of said coupling includes hose gripping means extending radially inwardly thereof, and, said hose gripping means being circumferentially and intermittently positioned.

10. The joint of claim 6, wherein:

the sheet type of housing is a stainless steel.

* * * * *

UNITED STATES PATENT OFFICE
CERTIFICATE OF CORRECTION

PATENT NO. : 3,905,621
DATED : September 16, 1975
INVENTOR(S) : Thomas M. DeMarco It is certified that error appears in the above-identified patent and that said Letters Patent are hereby corrected as shown below:

Column 1, line 30, change "inacted" to --enacted--;
column 6, line 32, change "bracket" to --includes--.

Signed and Sealed this second Day of March 1976

[SEAL]

Attest:

RUTH C. MASON
Attesting Officer

C. MARSHALL DANN
Commissioner of Patents and Trademarks